United States Patent
Van Dyke et al.

(10) Patent No.: US 7,436,410 B2
(45) Date of Patent: Oct. 14, 2008

(54) SYSTEM AND METHOD FOR PROGRAMMING A CONTROLLER

(75) Inventors: Phil Van Dyke, Surrey (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 11/097,860

(22) Filed: Apr. 1, 2005

(65) Prior Publication Data

US 2006/0250404 A1    Nov. 9, 2006

(51) Int. Cl.
*G09G 5/36* (2006.01)

(52) U.S. Cl. ...................................... 345/559

(58) Field of Classification Search ............... 345/501, 345/503, 559, 564; 713/1, 2
See application file for complete search history.

(56) References Cited

U.S. PATENT DOCUMENTS

| | | | | |
|---|---|---|---|---|
| 4,503,401 A * | 3/1985 | Kyriakos et al. | ............. | 331/4 |
| 4,517,637 A * | 5/1985 | Cassell | ............. | 700/9 |
| 4,794,553 A * | 12/1988 | Watanabe et al. | ............. | 708/160 |
| 5,086,862 A * | 2/1992 | Graber et al. | ............. | 180/422 |
| 5,327,258 A * | 7/1994 | Ueda | ............. | 358/448 |
| 5,586,309 A * | 12/1996 | Lin | ............. | 713/501 |
| 5,793,386 A | 8/1998 | Larson et al. | | |
| 5,907,863 A * | 5/1999 | Bolyn | ............. | 711/167 |
| 5,999,200 A * | 12/1999 | Harkin et al. | ............. | 345/522 |
| 6,061,475 A * | 5/2000 | Blair | ............. | 382/239 |
| 6,204,864 B1 | 3/2001 | Chee | | |
| 6,219,071 B1 | 4/2001 | Krech, Jr. et al. | | |
| 6,272,627 B1 | 8/2001 | Mann | | |
| 6,414,687 B1 | 7/2002 | Gibson | | |
| 6,525,738 B1 | 2/2003 | Devins et al. | | |
| 6,741,257 B1 | 5/2004 | Retika | | |
| 6,810,514 B1 * | 10/2004 | Alfke et al. | ............. | 716/16 |
| 6,832,372 B1 * | 12/2004 | Frye et al. | ............. | 717/168 |
| 6,956,511 B2 * | 10/2005 | Thomas et al. | ............. | 341/67 |
| 2003/0030827 A1 * | 2/2003 | Hirayama | ............. | 358/1.9 |
| 2005/0012735 A1 * | 1/2005 | Low et al. | ............. | 345/211 |
| 2005/0066073 A1 * | 3/2005 | Jacobs et al. | ............. | 710/15 |

* cited by examiner

*Primary Examiner*—Kee Tung
*Assistant Examiner*—Edward T La Barr
(74) *Attorney, Agent, or Firm*—Mark P. Watson

(57) ABSTRACT

A system for configuring a chip to perform certain operations is provided. The system includes a CPU. The CPU is in communication with a graphics controller. The graphics controller includes a non-volatile memory for storing a look up table (LUT). The graphics controller further includes a register port. The CPU provides a LUT value to the register port. Look up circuitry, which is in communication with the LUT register port, receives the LUT value from the register port and the LUT circuitry retrieves a corresponding LUT sequence from the LUT. The LUT sequence represents an operation to be performed by the LUT circuitry. The system is further provided with a register block, which can be programmed with values based on the operation to be performed.

14 Claims, 4 Drawing Sheets

SYSTEM AND METHOD FOR PROGRAMMING A CONTROLLER

BACKGROUND

Description of the Related Art

At the present time, more and more electronic devices include chips which function as controllers to control various parts of devices. There are chips that control disks, system logic, audio, and graphics. These chips generally have a set of registers that define various functions. The functions are defined by programming certain sequences into the chip. Some of these sequences are repeatedly programmed into the chip. Examples of such repeatedly programmed sequences include Huffman/Quantization tables for joint photographic expert group (JPEG) encoding, changing phase locked loop (PLL) frequency, changing a size of the display window, etc. For each sequence, a series of registers are written in the appropriate order and with the appropriate values to perform the desired function.

At the present time, the host central processing unit (CPU) must perform these register writes and calculate each time the correct values to write to the appropriate registers. Moreover, if any of these values have to be changed, the CPU must repeat all the steps again. In addition to these repetitive sequences, typical power up sequences are written to the chip to configure the chip for the device for which the chip is being used, such as, a display device, a camera, etc. As with the sequences mentioned above, these configuration sequences are known sequences for a particular device set up. The host CPU must write these power up sequences to the chip every time the device is turned on.

Several drawbacks exist with the current implementation of programming repetitive sequences into the chip to perform a given function or to configure the chip for a given configuration. Firstly, the host CPU uses valuable processing time to write to the appropriate registers of the chip with the appropriate sequence values. Secondly, the bandwidth of the host bus interface is reduced because of the overhead of writing the appropriate registers for a given function or configuration. Thirdly, the activity on the host bus interface increases power consumption of the system. Fourthly, configuring the chip and writing repetitive sequences to the chip is restricted by how fast the host CPU can write to the chip.

Therefore, a need exists to reduce the CPU overhead and system bandwidth when repetitive sequences are programmed in a chip for a given function or when the chip is configured for a given configuration.

SUMMARY

Broadly speaking, the present invention fills these needs by providing a system and method to program a chip with repetitive sequences and to configure the chip with minimum overhead on the CPU.

The embodiments described herein provide a system and method that limits the overhead on the CPU associated with performing repetitive programming of the chip with the same sequences and repetitive writing to the chip with sequences for configuring the chip. The overhead on the CPU is reduced by having a register port to access a look up table (LUT) stored in a non-volatile memory. At each address location (LUT entry) in the LUT, sequence values to be written to the chip for a given function or configuration are stored. Once the register port is provided with the address to access the LUT and the value to program the chip, the CPU is freed from programming or writing the values to the register block associated with a particular function. Using the data from the LUT, the registers in the chip are programmed with appropriate values in the appropriate order. Thus, each time a given register block is to be programmed with a given set of values or a given sequence of register accesses, the CPU only needs to provide the address in the LUT and the data to be used to program the chip. The CPU is no longer required to program each of the registers in the register block with the appropriate values.

It should be appreciated that the present invention can be implemented in numerous ways, including as a process, an apparatus, a system, a device, or a method. Several inventive embodiments of the present invention are described below.

In one embodiment, a system for configuring a chip to perform certain operations is provided. The system includes a CPU. The CPU is in communication with a graphics controller. The graphics controller includes a non-volatile memory for storing a look up table (LUT). The graphics controller further includes a register port. The CPU provides a LUT value to the register port. Look up circuitry, which is in communication with the LUT register port, receives the LUT value from the register port and the LUT circuitry retrieves a corresponding LUT sequence from the LUT. The LUT sequence represents an operation to be performed by the LUT circuitry. The system is further provided with a register block, which can be programmed with values determined by the LUT sequence.

In another embodiment, a controller for configuring a chip to perform certain operations is provided. The controller includes a non-volatile memory containing a LUT. The controller further includes a register port capable of receiving an entry for the LUT. The register port is in communication with LUT circuitry and the register port provides a LUT entry to the LUT circuitry. The LUT circuitry fetches a corresponding LUT value for the LUT entry from the LUT. The LUT circuitry programs the register block according to the function defined by the fetched LUT value.

In another embodiment, a method for programming a register block within a controller to configure a chip is provided. The method includes receiving a first value representing an address within a LUT. The method further includes fetching a second value from the address represented by the first value. Thereafter, a register block is programmed according to a function defined by the second value.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is disclosed for programming a chip with repetitive sequences and writing configuration sequences to the chip. It will be obvious, however, to one skilled in the art, that the present invention may be practiced without some or all of these specific details. In other instances, well known process operations have not been described in detail in order not to unnecessarily obscure the present invention.

The embodiments described herein provide a system and method that simplifies the task of the CPU when performing the chip configuration and repetitive sequence programming. The task of the CPU is simplified by having a register port that accesses a look up table (LUT) stored in a non-volatile memory. Each entry in the LUT contains sequence data, which represents a function to be performed by the chip. The CPU provides the register port with an address in the LUT. The LUT circuitry in the chip receives the address from the register port and fetches the corresponding sequence data from the LUT. The LUT circuitry programs the register block according to the data fetched from the LUT. Each time the register block in the chip is to be programmed with a given sequence of values, the CPU only needs to provide the address in the LUT that corresponds to that LUT entry. The CPU is no longer required to program each of the registers in the register block.

Figure 1:
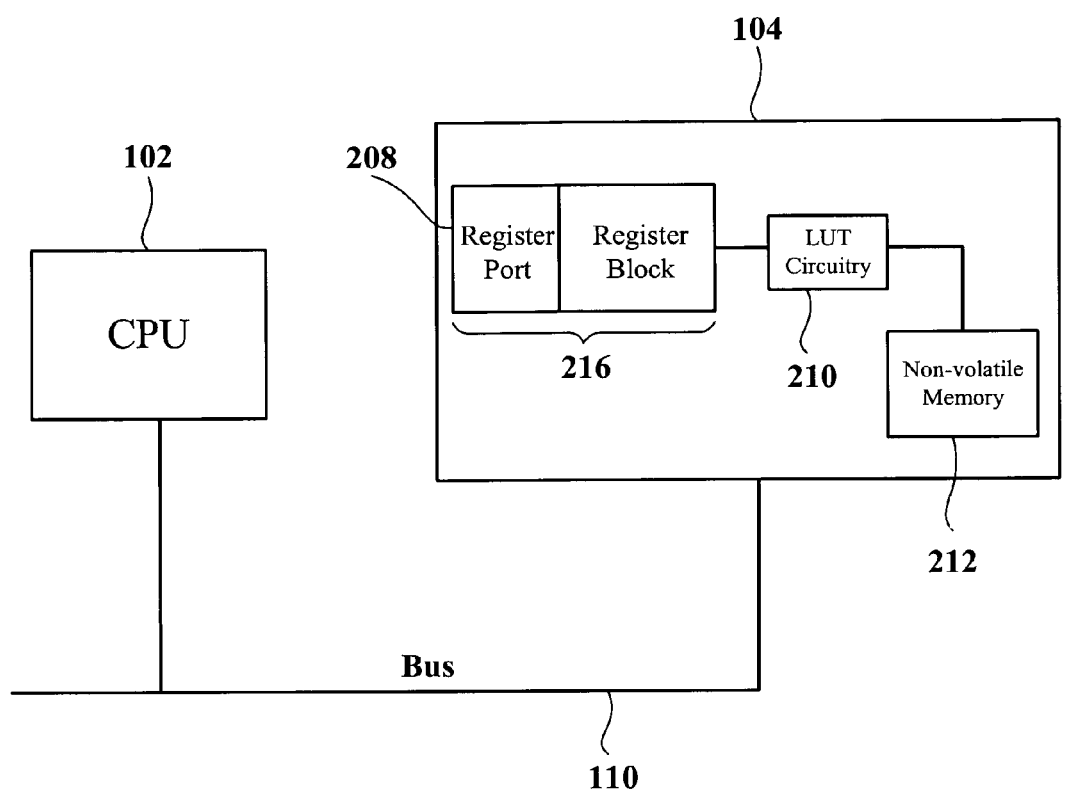
FIG. 1 illustrates a high level system block diagram in accordance with an embodiment of the present invention.

FIG. 1 illustrates a high level system block diagram in accordance with an embodiment of the present invention. As shown, FIG. 1 includes a CPU 102 and a chip 104. CPU 102 and a chip 104 are connected to each other by bus 110. The chip 104 may be configured to perform certain operations. The chip 104 may be a mobile graphics controller, graphics controller, audio controller, memory card controller, a liquid crystal display controller (LCDC) etc. Register block 216, register port 208, LUT circuitry 210 and non-volatile memory 212 are further described with reference to FIG. 2.

Figure 2:
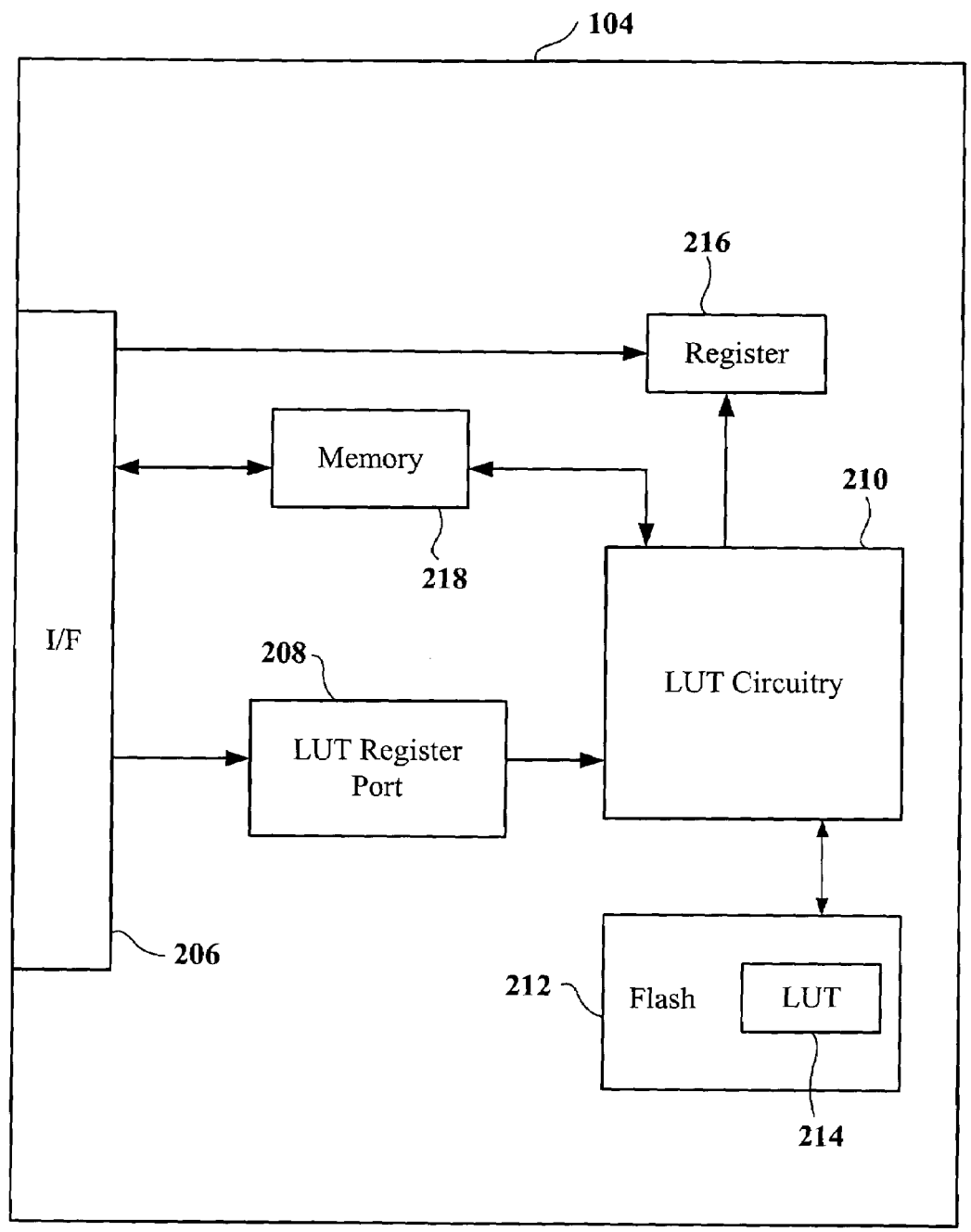
FIG. 2 shows a detailed diagram of the chip illustrated in FIG. 1 in accordance with an embodiment of the present invention.

FIG. 2 shows a detailed diagram of the chip 104 illustrated in FIG. 1. The chip 104 includes a host interface 206 that is capable of writing to the memory 218, the register port 208, or the register block 216. Further shown in FIG. 2 is a register port 208. The LUT register port points to, i.e., is in communication with, LUT circuitry 210. The LUT circuitry 210 is in communication with the non-volatile memory 212. The non-volatile memory 212 may be a flash memory, electronically programmable read only memory (EPROM), electronically erasable programmable read only memory (EEPROM), etc. Stored in the non-volatile memory 212 is the look up table 214. The look up table (LUT) 214 stores the values to be used for a given function or configuration. In one embodiment, the values stored in the LUT 214 are fixed and are programmed in the factory according to the user specification. In another embodiment, the values stored in the LUT are dynamic and can be changed according to the need of the user. Also, one skilled in the art should understand that the size of the register port 208 may be expanded or shrunk depending on the number of entries needed in the LUT 214.

As shown, the LUT circuitry 210 is also in communication with register block 216. One skilled in the art will understand that the chip 104 may contain more than one register block 216. In one embodiment, the register block is a set of all internal registers in a chip grouped together by address for particular functions. Each of the register blocks is designated to store values to be used for a particular function. For example, register block 216 may store values for the phase locked loop (PLL) frequency, while another block may store a power up sequence for configuring the chip 104. Register block 216 includes one or more registers (not shown), each of which is to be programmed with appropriate values for the designated functions. In one embodiment, the register port 208 may be a specific register in the register block 216 that points to the LUT circuitry 210.

When the register block 216 is to be programmed with repetitive sequences or configuration sequences, the CPU shown in FIG. 1 writes a value with a number of bits into the register port 208. Among the number of bits, a certain number of bits represents an address in the LUT 214 and the rest of the bits represent the data to be used to program the register block 216. For some sequences, such as a configuration sequence, the data bits are not needed as the LUT entry contains fixed values to write to fixed registers. For other sequences, such as programming a PLL frequency, the data bits are needed to specify the frequency to program the PLL. The LUT circuitry 210 receives the address and the data value from the register port 208 and retrieves the sequence of values stored in the corresponding address in the LUT 214.

If the LUT entry corresponds to a sequence value that does not require the data bits (e.g. configuration sequence), the LUT circuitry just reads the data, and which registers to write that data to. Additionally, the order in which to write to those registers is provided from the specified LUT address. The values stored in the LUT entry would be of the form [register address 0] [register data 0] [register address 1] [register data 1], etc. The LUT circuitry would then write the specified registers with the specified data in the specified order. If the LUT entry corresponds to a sequence that does require the data bits (e.g., PLL frequency setting), the LUT circuitry reads the LUT data as before, but all the data written to the registers would not all be stored in the LUT entry. Instead, a formula would be stored at some or all the register data locations and the data value sent to the LUT register port would be used by the formula to calculate the value to be written to the specified register. The values stored in the LUT entry would be of the form [register address 0] [register formula 0] [register address 1] [register formula 1] [register address 2] [register formula 2], etc.

The register values stored in the register block 216 may control different modules of the chip 104. For example, one register block value may control the PLL frequency, while another register block may control Huffman/Quantization tables for JPEG encoding, while another register block controls changes to the size of display window, etc. As can be seen, the register values are programmed using the register port 208, LUT circuitry 210, and LUT 214. Thus, the CPU provides the address in the LUT 214, and any value which may be needed to program the desired register block. From the register addresses stored in each LUT 214 entry, the LUT circuitry determines which registers have to be programmed for a given LUT entry. These registers are programmed by the LUT circuitry with either fixed values stored in the LUT 214 and/or with calculated values based on stored formulas that use the data value provided by the CPU. This frees the CPU from having to write repetitive or configuration sequences to appropriate register blocks 216 within chip 104. This also frees up host bus bandwidth resulting in decreased power consumption and increased overall system performance.

Figure 3:
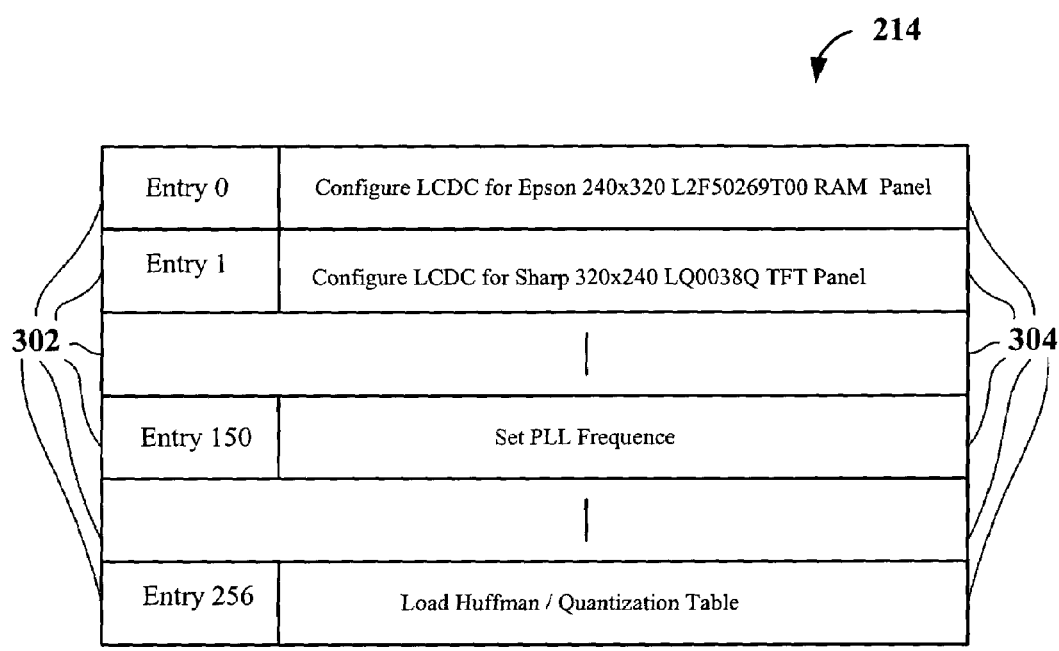
FIG. 3 shows an exemplary LUT in accordance with an embodiment of the present invention.

FIG. 3 shows an exemplary LUT 214 in accordance with an embodiment of the present invention. The LUT 214 is shown to include addresses 302 and the operations 304 associated with each of the addresses. As shown, the first address 304 in the LUT 214 is entry 0, and the operation 304 associated with the entry 0 is to configure LCDC for an EPSON panel. Similarly, for entry 1, the corresponding operation is to configure LCDC for a SHARP panel, for entry 150 the corresponding operation is to set the PLL frequency, and for entry 256 the corresponding operation is to load Huffman/Quantization Tables. So, when the CPU provides address 0 and a data value to the LUT register port 208 in FIG. 2, the LUT circuitry 210 will retrieve the corresponding operation from the LUT 214. In this case, the corresponding operation is to configure the LCDC for an EPSON panel. Since this is a configuration sequence, no data value is needed by the LUT circuitry, and the LUT circuitry will just write the data stored at LUT entry 0 into the register block 216 that controls the configuration of the LCDC for the specified EPSON panel. Similarly, if the CPU provides any of the other addresses in the LUT to the LUT register port, those operations will be performed and the data stored or calculated for those LUT entries will be written to the register block 216 that controls the corresponding operations.

In one embodiment, the data values to be used by the LUT circuitry 210 to write to the register block may be stored in the LUT 214. In such instances, the CPU only needs to provide the address in the LUT to the register port 208 and the LUT circuitry 210 can retrieve from the LUT 214, the data values to be used by the LUT circuitry 210. For example, a particular PLL frequency may be pre-programmed into the LUT so that the CPU only needs to provide the address in the LUT 214 in which that particular PLL value is stored. The values to be programmed into the registers to achieve this PLL frequency can be retrieved from the corresponding LUT 214 address and the values written in the corresponding register block 216. It should be appreciated that the PLL frequency value may be supplied by the CPU as discussed above with reference to FIG. 2, or the PLL frequency value may be pre-programmed into LUT 214 and the CPU supplies an address for the pre-programmed value.

Another example of values that may be pre-programmed into the LUT 214 is the Huffman/Quantization tables used by a JPEG encoder to determine the quality and compression of the encoded JPEG image. These quality settings may be referred to as Quality factor 1-100, with 100 being the best quality. To load these tables, many registers within the register block must be programmed. If the quality has to be changed with currently available methods, a lot of bandwidth must be used to re-program the tables. On the other hand, with the hardware programming method described herein, only a write to the register port 208 with the address of the LUT entry corresponding to the Huffman/Quantization Tables of the quality factor desired needs to be done.

Figure 4:
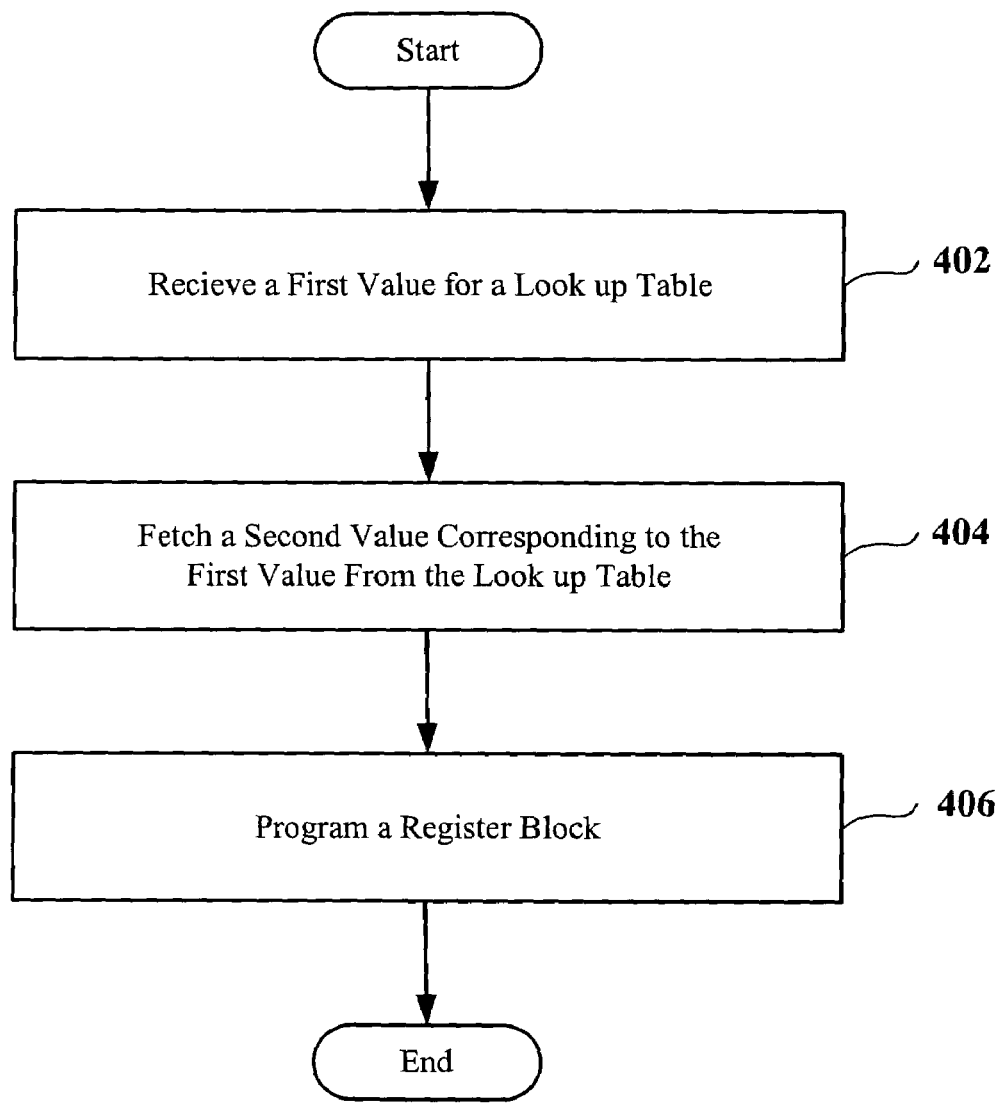
FIG. 4 is a flow chart illustrating the method of operations involved in programming a chip with repetitive sequences and writing configuration sequences to the chip, in accordance with an embodiment of the present invention.

In this example, entry 256 of the address 302 in the LUT 214 stores the Huffman/Quantization tables for a particular quality factor. When the host CPU provides LUT address 256 to the register port 208, then the compression ratio for the particular quality factor will be loaded into the LUT circuitry 210 from LUT 214. The LUT circuitry 210 can then program the designated register block 216 with the values associated with the particular quality factor. In one embodiment, LUT 214 may contain an entry that calculates the necessary data values to be written to the appropriate register block for a given quality factor based on a quality factor data value passed to the LUT register port by the CPU. One skilled in the art should understand that the size of the LUT 214 shown in FIG. 3 is exemplary. The size of the LUT 214 may vary depending on the number of entries needed to support the configurations and repetitive sequences desired. Moreover, a portion of the memory 218 in FIG. 2 may be set aside to store repetitive sequences and to write configuration sequences. Thus, if new addresses or data cannot be added to the LUT 214, then the portion of the memory may be used to add new values FIG. 4 is a flow chart illustrating the method of operations involved in programming a controller with repetitive sequences and writing configuration sequences to a controller, in accordance with an embodiment of the present invention. The method begins with operation 402, in which the controller receives a first value for a look up table. As described above, the CPU writes the first value for the look up table into a register port within the controller. The first value represents the address in the LUT and a data value to be passed to that LUT entry if needed. Each of the addresses in the LUT includes a corresponding data entry in the LUT. In one embodiment, the data entry may represent an operation to be performed using the data value written to the register port. While in another embodiment, the data entry may represent the values to be used for programming the register block. Alternatively, the data entry may represent both an operation to be performed and the values to be used for programming. Accordingly, the LUT circuitry retrieves a corresponding data value from the LUT in operation 404. The LUT circuitry performs the functions dictated by the data retrieved from the LUT.

For example, if the register block is to be programmed with the sequences for a particular PLL frequency, then the data retrieved from the LUT will indicate to program the designated register block with values to achieve the desired PLL frequency. Thus, the register block will be programmed to achieve the desired PLL frequency. In one embodiment, the host CPU may provide a data value to be used to program the register block. In such cases, the data corresponding to the address in the LUT will indicate the function that is to be performed. For example, if the host CPU provides the address and the data, for programming a register block with the values for a PLL frequency, then the data corresponding to the address in the LUT will indicate that the registers in the designated register block be programmed with values corresponding to the PLL frequency value provided by the host CPU. Accordingly, in operation 406, the designated register block is programmed either with the values stored at the address in the LUT or the values calculated from the data value provided by the host CPU.

The hardware programming method described above may also be expanded to user defined sequences that would reside in a SRAM or DRAM memory. The user may define which registers would be written with what values for a given location in the memory. Further, the sequence could also be defined to be performed only during certain times, such as, during horizontal non-display times of a liquid crystal display interface.

As described above, the advantages of the present invention are numerous. Firstly, the CPU is freed from writing to the appropriate registers in the register block with repetitive sequences and configuration sequences. Thus, the CPU can perform other processing tasks besides programming the chip registers. Secondly, the bandwidth on the host bus interface is increased because of the reduced overhead associated with repetitive writing to the appropriate registers for a given function or configuration. Thirdly, the power consumption is reduced because there is less activity on the host bus interface due to the decreased activity between the host and the chip. Moreover, the configuration of the controller or the repetitive sequence is not time limited by the speed of the CPU. Instead, these tasks may be performed at the speed of the controller.

With the above embodiments in mind, it should be understood that the invention may be practiced with other computer system configurations including hand-held devices, microprocessor systems, microprocessor-based or programmable consumer electronics, minicomputers, mainframe computers, and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A system for configuring a chip to perform certain operations, comprising:
   a central processing unit;
   a graphics controller in communication with the central processing unit, wherein the graphics controller includes,
   a non-volatile memory storing a look up table, the look up table populated with look up table sequences, the look up table sequences including both an address portion and a data portion, wherein one of the look up table sequences includes a data portion representing a phase locked loop frequency;
   a register port capable of receiving a look up table (LUT) value;
   LUT circuitry in communication with the register port, wherein the LUT circuitry retrieves a corresponding LUT sequence from the LUT based on the LUT value provided by the register port;
   a memory having a portion set aside for storing additional look up table sequences generated from one of the look up table sequences in the non-volatile memory; and
   a register block designated to be programmed with an appropriate value determined by the LUT sequence.

2. A system as recited in claim 1, wherein the LUT sequence represents an operation to be performed by the LUT circuitry.

3. A system as recited in claim 2, wherein the operation is one of, changing a phase locked loop (PLL) frequency of the chip, programming a Huffman/Quantization table for a joint photographic expert group (JPEG) encoder, changing a size of the display window, and writing power up sequences for configuring the chip for a certain device.

4. A system as recited in claim 1, wherein the LUT sequence represents a sequence value to be written to the register block for a given function.

5. A system as recited in claim 1, wherein the LUT sequence represents a configuration sequence.

6. A system as recited in claim 1, wherein the LUT sequence represents a formula to be used for calculating the appropriate value to program the register block.

7. A system as recited in claim 1, wherein the graphics controller further includes a host interface.

8. A system as recited in claim 7, wherein the host interface is configured to write to one of the memory or the register port.

9. A system as recited in claim 1, wherein the LUT value represents an address in the LUT and a data value, the LUT value being generated from the central processing unit.

10. A controller for configuring a chip, comprising:
    a non-volatile memory containing a look up table, the look up table populated with look up table sequences, the look up table sequences including both an address portion and a data portion, wherein the data portion of one of the look up table sequences is a formula representing a quality factor for encoding data;
    a register port capable of receiving a LUT entry for the look up table (LUT);
    a register block capable of being programmed with data based on a function to be performed by the chip;
    a memory having a portion set aside for storing additional look up table sequences generated from one of the look up table sequences in the non-volatile memory; and
    LUT circuitry in communication with the register port, non-volatile memory, the memory and the register block, wherein the LUT circuitry receives the LUT entry from the register port and fetches corresponding look up table sequences based on the LUT entry from the LUT and programs the register block using the look up table sequences.

11. A controller of claim 10, wherein the LUT entry represents an address in the LUT and a data value.

12. A controller of claim 11, wherein the data value is represented by a formula to be used for calculating the appropriate value to program the register block.

13. A controller of claim 12, wherein another one of the look up table sequences includes a data portion representing a phase locked loop frequency.

14. A controller of claim 11, wherein the address in the LUT represents an order in which registers within the register block are written to.

* * * * *